United States Patent

Barnes et al.

[11] Patent Number: 5,314,700
[45] Date of Patent: May 24, 1994

[54] POULTRY FEED COMPONENT

[75] Inventors: Dewey G. Barnes; Sebastian M. Laurent, both of Baton Rouge, La.

[73] Assignee: Ethyl Corporation, Richmond, Va.

[21] Appl. No.: 647,285

[22] Filed: Jan. 28, 1991

[51] Int. Cl.$^5$ .................... A01N 59/06; A01N 55/00; A01N 43/54; A01N 43/16

[52] U.S. Cl. ........................ 424/684; 514/63; 514/259; 514/460

[58] Field of Search ................ 424/682, 684; 514/63, 514/259, 460

[56] References Cited

U.S. PATENT DOCUMENTS

| | | | |
|---|---|---|---|
| 2,882,243 | 4/1959 | Milton | 568/917 |
| 3,320,124 | 5/1967 | Waletzky et al. | 514/259 |
| 4,610,882 | 9/1986 | Laurent et al. | 424/684 |
| 4,610,883 | 9/1986 | Laurent et al. | 424/684 |

OTHER PUBLICATIONS

*The Merck Veterinary Manual*, 5th Edition, p. 1132, (1979).

Primary Examiner—Frederick E. Waddell
Assistant Examiner—K. Weddington
Attorney, Agent, or Firm—Richard J. Hammond

[57] ABSTRACT

New methods and feed compositions are disclosed for enhancing the reduction of coccidial-induced intestinal lesions in poultry and for enhancing shank pigmentation in poultry. Such methods comprise coadministering zeolite and coccidiostats, such as in a feed mixture or by separate administration.

25 Claims, No Drawings

POULTRY FEED COMPONENT

BACKGROUND

Coccidiosis, caused by protozoans of the genera Eimeria and Isospora, may be present in any domesticated animal species but is ubiquitous in the poultry industry with serious consequences. The life cycle involves both asexual and sexual intracellular parasitic stages characterized by a rapid development and multiplication of infective stages with consequent destruction of, primarily, the intestinal lining of the host.

Coccidia species are cosmopolitan and widespread in the animal kingdom, although most of them are limited to a narrow range of host species and organ systems. Some coccidia, e.g. Toxoplasma, may pass from one host species to another changing their target organs from host to host. The life cycle of Coccidia includes cysts, sporozoites, schizonts, merozoites, and gametocytes. Eimeria and Toxoplasma are economically and medically important coccidia.

Eimeria infect many vertebrates, including fish, poultry, farm animals, dogs and cats. The parasite first invades the epithelial lining of the digestive tract and may cause diarrhea, sloughing, and ulceration of the intestinal lining, and hemorrhage, metabolic imbalance, and anemia and bacteremia. Depending on severity and duration, the consequences may range from growth retardation to death.

Eradication of Eimeria species with presently available drugs would be impractical because of toxicological and economic considerations. Accordingly, anticoccidials are currently used in animal husbandry as coccidiostats. Mixed with feeds, the cocciodiostats serve to minimize the intensity of infection or to reduce clinical symptoms to a nonfatal course. In this way, time is gained for the host to build up immune defenses. Eimeria species develop drug resistance quite rapidly so that development of new anticoccidials is economically vital for animal farming. Anticoccidial agents are added routinely as feed components throughout the life of broiler chickens. A partial list of additives includes amprolium, ethopabate, robenidine, arprinocid, monensin, lasalocid, chlortetracycline, and the sulfa compounds. Historically, the appearance of resistance by the coccidia to anticoccidial agents has been rapid and frustrating. This resistance has not yet been observed to any notable degree with the ionophores even after more than a decade of extensive use. A program of rotation, where anticoccidials with differing modes of action are used in succession minimizes the impact of resistance.

One group of coccidiostats (i.e., anticoccidial agents) are ionophore coccidiostats. The most widely used additives are compounds capable of transporting cations into or through a lipophilic environment, which compounds are termed "ionophores". Ionophores are compounds such as polyether antibiotics as well as synthetic crown ethers, cryptates, cyclodepsipeptides and macrotetralieds antibiotics. The polyethers are distinguished from these other ionophores, however, in being acids which yield neutral salt complexes, whereas valinomycin and many of the other naturally occurring ionophores are neutral cyclic structures which yield positively charged cation complexes. The name polyether has become the term of choice to characterize these antibiotics as a result of multiplicity of cyclic ethers found in all members of this unique group of microbial products. Representative of the ionophore antibiotics are compounds such as monensin, lasalocid and salinomycin.

Known polyether antibiotics are isolated from the Streptomyces genus of microorganisms. More than thirty polyether antibiotics have been reported. The polyethers exhibit good in vitro activity against gram-positive and mycobacteria but do not inhibit gram-negative microorganisms. Some of the compounds have been reported active against phytopathogenic bacteria and fungi. Due to the high parenteral toxicity of the polyethers, they have found no use as clinical antibacterial agents, but are playing an increasing role in veterinary medicine as coccidiostats in poultry and growth promotants in ruminants such as cattle and sheep.

Improvements in the means of controlling coccidiosis in animals, especially poultry, remains a need in animal husbandry and food industries.

SUMMARY OF THE INVENTION

New methods and feed compositions are disclosed for enhancing the reduction of coccidial-induced intestinal lesions in poultry and for enhancing shank pigmentation in poultry. Such methods comprise coadministering zeolites and coccidiostats, such as in a feed mixture or by separate administration.

DESCRIPTION OF THE PREFERRED EMBODIMENTS

Unexpectedly it has been discovered that coadministering zeolites and certain coccidiostats can result in enhancing the reduction of coccidial-induced intestinal lesions in poultry and can also result in enhancing shank pigmentation in poultry.

One embodiment of the present invention is a method of enhancing the effectiveness of an ionophoric coccidiostat in reducing coccidial-induced intestinal lesions in poultry comprising administering to said poultry said ionophoric cocciodiostat and zeolites such that said ionophoric coccidiostat and said zeolites coexist in said poultry. Administering of coccidiostat and zeolites in accordance with the embodiment effectively enhances the reduction of coccidial-induction lesions compared to the amount of reduction achieved by administering coccidiostat alone. Administration can be by coadministration by use of means such that the coccidiostat and the zeolite are administered simultaneously. Such simultaneous administration can be effected by physically mixing coccidiostats and zeolite together to produce a mixture which is orally given to the subject. Accordingly, embodied methods can comprise administering wherein said ionophoric coccidiostat and zeolite are admixed in an ingestable media prior to administering. Preferably, such ingestable media is feed. Such oral administration can be performed as part of the feeding procedure of the subject or as a separate health procedure.

Embodiments include methods wherein the zeolite is the carrier of the ionophoric coccidiostat during administering. Such embodiments of administering simultaneously the coccidiostat and zeolite comprise use of zeolite onto which the coccidiostat has been absorbed. The absorption of the coccidiostat onto the zeolite can be performed by methods obvious to those of the art. For example, a zeolite slurry in aqueous medium can be impregnated with the required amount of coccidiostat, filtered and dried. The dried product containing the coccidiostat is admixed with the normal feed ration and fed to the animal.

Another embodiment comprises the use of the mixture of the coccidiostat and zeolite as a part of the feed given to the subject. Such use can comprise a simple physical mixing or blending of the components with the feed or in other methods of presentation of the feed to the subject, such as forming feed pellets comprising feed, coccidiostat and zeolite. Such mixtures can be manufactured by mixing the components separately or otherwise, such as by premixing the coccidiostat and the zeolite or by absorbing the coccidiostat onto the zeolite and then further mixing with the feed.

Other embodiments comprise a method of enhancing the reduction of coccidial-induced intestinal lesions in poultry comprising coadministering to the poultry an ionophoric coccidiostat and zeolite wherein the ionophoric coccidiostat and the zeolite are admixed in an ingested media. Such ingested media can comprise the feed compositions discussed above or can comprise media other than feed administered to the poultry for ingestation.

Other embodiments comprise administering the zeolite and the coccidiostat other than simultaneously such that both the zeolite and the coccidiostat become coexisting in the gut of the poultry. Such methods can comprise the sequential administration of the zeolite and the coccidiostat. Administration ca be in either order of the zeolite and the coccidiostat. In such sequential administration, either or both of the zeolite and the coccidiostat can be administered alone or in combination with other material.

The ionophoric coccidiostats used in embodiments of the present invention for enhancing the reduction of coccidial-induced intestinal lesions are preferably polyether antibiotics. Preferred polyether antibiotics are selected from a group consisting of lasalocid, monesin and salinomyoin.

The ratio of the zeolite to coccidiostat should be an effective ratio to enhance the reduction of coccidiostat-induced intestinal lesions in poultry. Typical weight ratios of coccidiostat to zeolite can range from about 0.2 weight % to about 15 weight %.

Another unexpected result from the use of the zeolite and coccidiostat in coadministration is the improved pigment absorption which occurs in the shanks of poultry. Unexpectedly it has been found that coadministration of zeolite and coccidiostat can reduce coccidial-induced pigmentation loss in poultry shanks. For such purposes, the coccidiostats described above can be used. Additionally, it has been found that chemical coccidiostats (e.g., halofuginone) as well as ionophoric coccidiostats (e.g., lasalocid, monesin and salinomycin) can be utilized for such pigmentation loss reduction. Without wishing to be bound by theory, it is believed that such coadministration of zeolite and coccidiostat works to enhance the absorption of xanthophylls in the poultry shank. Such halofuginones are halogenated derivatives (i.e., 7-bromo-6-chlorofebrifugine) such as those prepared in GWALTZKY et al., U.S. Pat. No. 3,320,124.

Other embodiments of the present invention are compositions comprising zeolites and coccidiostats wherein the ratio of coccidiostat to zeolite is effective to enhance the effectiveness of the coccidiostat in reducing coccidial-induced intestinal lesions in poultry. Further embodiments of the present invention are compositions comprising zeolite and coccidiostats wherein the ratio of zeolite to coccidiostat is effective to enhance the reduction of coccidial-induced pigmentation loss in the shank of poultry. Such compositions in either embodiment can be prepared prior to the administration of the coccidiostat to the poultry or manufactured in situ within the gut of the poultry. A preferred composition in either embodiment is zeolite with absorbed coccidiostat. A preferred zeolite is zeolite A. A preferred weight ratio of cocciddiostat to zeolite A is from about 0.2 weight percent to about 15 weight percent. Preferred coccidiostat are lasalocid monesin and salinomycin with halofuginone being an additionally preferred coccidiostat for compositions to enhance reduction of pigmentation loss.

The zeolite which can be used in embodiments of the present invention are those known in the zeolite art. For example, the zeolite can be zeolites having crystalline, hydrated aluminosilicates of alkali and alkaline earth cations, having infinite, three-dimensional structures.

Zeolites consist basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example a sodium ion. This balance may be expressed by the formula $Al/Na=1$. The spaces between the tetrahedra are occupied by water molecules prior to dehydration.

A preferred zeolite is zeolite A. Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

$$Na_2O \cdot Al_2O_3 \cdot xSiO_2 \cdot yH_2O$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range $1.85\pm0.5$.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

$$1.0\pm0.2\ Na_2O\ Al_2O_3\ 1.85\pm0.5\ SiO_2 \cdot yH_2O.$$

In the formula, "y" may be any value up to 6.

An ideal zeolite A has the following formula:

$$(NaAlSiO_4)_{12} \cdot 27H_2O$$

Among the ways of identifying zeolites and distinguishing them from other zeolites and other crystalline substance, the X-ray powder diffraction pattern has been found to be a useful tool. In obtaining the X-ray powder diffraction patterns, standard techniques are employed. The radiation is the Kα doublet of copper and a Geiger counter spectrometer with a strip chart pen recorder is used. The peak heights, I, and the position as a function of 2Θ where Θ is the Bragg angle, are read from a spectrometer chart. From these, the relative intensities, 100 $I/I_0$, where $I_0$ is the intensity of the strongest line or peak and d the interplanar spacing in angstroms corresponding to the recorded lines are calculated.

X-ray power diffraction data for a sodium zeolite A are given in Table I.

TABLE A

X-RAY DIFFRACTION PATTER FOR ZEOLITE A

| $h^2 + k^2 + l^2$ | d (A) | $100^I/I_0$ |
|---|---|---|
| 1 | 12.29 | 100 |
| 2 | 8.71 | 70 |
| 3 | 7.71 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for Zeolite A are given in Table B.

TABLE B

MOST SIGNIFICANT d VALUES FOR ZEOLITE A
d Value of Reflection in A 12.2 ± 0.2
8.7 ± 0.2
7.10 ± 0.15
5.50 ± 0.10
4.10 ± 0.10
3.70 ± 0.07
3.40 ± 0.06
3.29 ± 0.05
2.98 ± 0.05
2.62 ± 0.05

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist", Vol. 28, page 545, 1943, permits a quick check of the silicon to aluminum ratio of the zeolite. According to the description of the test, zeolite minerals with a three-dimensional network that contains aluminum and silicon atoms in an atomic ratio of Al/Si=2/3=0.67, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminum-silicate water mixture having an $SiO_2:Al_2O_3$ mole ratio of from 0.5"1 to 1,5:1 and $Na_2O/Na_2O$ mole ratio of from about 35:1 to 200:1, maintaining the mixture at a temperature of from 20° C. to 175° C. until zeolite A is formed, and separating the zeolite A from the mother liquor.

The following experiments are intended to illustrate embodiments of the present invention but are not intended to limit the scope of the invention by their presentation herein.

EXPERIMENTS

2880 One-day-old chicks were distributed randomly to 48 pens. There were 6 replicate pens per treatment, each pen contained 60 males. Zeolite A was administered by use of EFC (Ethacal feed component), a commercially available feed supplement which is a free flowing white Zeolite A powder of bulk density of 23–29 pounds per cubic foot with a mean particle size of 3.0 microns and having the following elemental analysis:

| ELEMENTAL ANALYSIS | % |
|---|---|
| Sodium (Na) | 12.6 |
| Aluminum (Al) | 14.6 |
| Silicon (Si) | 15.3 |
| Oxygen (O) | 35.1 |

-continued

| | |
|---|---|
| Water of hydration (H₂O) | 22.2 |
| Heavy Metals (Food Chemicals Codex Method) | less than 10 PPM |
| Lead (Food Chemicals Codex Method) | less than 10 PPM |

| Treatment No. | Diets |
|---|---|
| 1 | Basal Diet + Monensin |
| 2 | Basal Diet + Monensin + EFC |
| 3 | Basal Diet + Lasalocid |
| 4 | Basal Diet + Lasalocid + EFC |
| 5 | Basal Diet + Halofuginone |
| 6 | Basal Diet + Halofuginone + EFC |
| 7 | Basal Diet + Salinomycin |
| 8 | Basal Diet + Salinomycin + EFC |

Monensin was added 110 gm/ton, lasalocid at 113 gm/ton, halofuginone at 2.72 gms/tons and salinomycin at 60 gm/ton. Representative broiler rations were used.

BMD (basal meal diet) was added to all rations, 50 gm/t in starter and 25 gm/t in grower and withdrawal. The anticoccidials were not included in the withdrawal rations.

At 21 days of age a mild challenge of 3 coccidial species was administered (E. acervulina, E. tenella and E. maxima). Lesion scores were read by an avian pathologist on 5 birds per pen at 27 days of age.

Because of coccidiosis often suppresses pigmentation, the shanks of 4 birds per pen were scored for pigmentation using the Roche Color Fan on day 39.

Production parameters of body weight, feed conversion, and mortality were obtained after 40 days. The birds were placed on withdrawal feeds and the experiment terminated at day 45.

The lesion score values were analyzed in pairs by coccidiostat with and without EFC using Chi Square and probabilities were obtained. All other data were subject to analysis of variance and treatment differences determined applying Duncan procedures.

EFFECT OF COCCIDIOSTAT WITH AND WITHOUT ETHACAL FEED COMPONENT (EFC) ON INTESTINAL LESION SCORES

| Treatment | INTESTINAL SCORES | | | | | |
|---|---|---|---|---|---|---|
| | Upper | Middle | Lower | Cecal | Total | P of F |
| Monensin | 2.20 | 0.87 | 0.00 | 2.00 | 5.07 | |
| Monensin + EFC | 1.43 | 0.43 | 0.10 | 0.93 | 2.89 | 0.01 |
| Lasalocid | 2.60 | 0.47 | 0.73 | 1.60 | 5.40 | |
| Lasalocid + EFC | 2.23 | 0.77 | 0.37 | 1.47 | 4.84 | 0.18 |
| Salinomycin | 1.10 | 0.03 | 0.27 | 1.80 | 3.20 | |
| Salinomycin + EFC | 0.80 | 0.07 | 0.10 | 1.30 | 2.27 | 0.01 |
| Halofuginone | 2.07 | 1.80 | 0.13 | 0.33 | 4.33 | |
| Halofuginone + EFC | 2.33 | 1.67 | 0.30 | 0.33 | 4.63 | 0.38 |

EFFECT OF COCCIDIOSTAT WITH AND WITHOUT ETHACAL FEED COMPONENT (EFC) ON SHANK PIGMENTATION (ROCHE COLOR FAN)

| Treatment | Pigmentation Score | Duncans (p < .05) |
|---|---|---|
| Monensin | 5.6 | D |
| Monensin + EFC | 6.1 | AB |
| Lasalocid | 5.1 | F |
| Lasalocid + EFC | 5.4 | E |
| Salinomycin | 5.9 | BC |
| Salinomycin + EFC | 6.2 | A |
| Halofuginone | 5.5 | DE |
| Halofuginone + EFC | 5.7 | CD |

EFFECT OF COCCIDIOSTAT WITH AND WITHOUT ETHACAL FEED COMPONENT (EFC) ON LIVE PRODUCTION PARAMETERS

| Treatment | 40 Day BW, lb. | Feed Comparison | Mortality, % |
|---|---|---|---|
| Monensin | 3.95 b | 1.87 ab | 6.74 ab |
| Monensin + EFC | 4.07 a | 1.83 c | 9.77 a |
| Lasalocid | 3.81 c | 1.86 ab | 9.52 a |
| Lasalocid + EFC | 3.77 c | 1.85 abc | 8.85 ab |
| Salinomycin | 4.02 a | 1.85 abc | 8.86 ab |
| Salinomycin + EFC | 4.06 a | 1.84 bc | 4.48 b |
| Halofuginone | 3.99 ab | 1.88 a | 7.22 ab |
| Halofuginone + EFC | 3.95 b | 1.87 ab | 6.98 ab |
| Average - Coccidiostats Only | 3.94 | 1.87 | 8.21 |
| Average - Coccidiostats + EFC | 3.96 | 1.85 | 7.52 |

What is claimed is:

1. A method of enhancing the effectiveness of an ionophoric coccidiostat in reducing coccidial-induced intestinal lesions in poultry comprising administering to said poultry said ionophoric cocciodiostat and a zeolite, the weight ratio of said coccidiostat to said zeolite being from about 0.2 weight percent to about 15 weight percent, such that said ionophoric cocciodiostat and said zeolite coexist in said poultry.

2. The method of claim 1 wherein said zeolite is zeolite A.

3. The method of claim 1 wherein said ionophoric cocciodiostat and said zeolite are admixed in an ingestable media prior to administering.

4. The method of claim 3 wherein said ingestable media is feed.

5. The method of claim 1 wherein said zeolite is the carrier of said ionophoric coccidiostat during administering.

6. The method of claim 1 wherein said coccidiostat and said zeolite are sequentially administered.

7. The method of claim 1 wherein the ionophoric coccidiostat is a polyether antibiotic.

8. The method of claim 7 wherein said polyether antibiotic is selected from a group consisting of lasalocid, monesin and salinomycin.

9. The method of claim 8 wherein the zeolite is zeolite A.

10. A method of enhancing the effectiveness of a coccidiostat in reducing coccidial-induced pigmentation loss in poultry comprising administering to said poultry said cocciodiostat and a zeolite, the weight ratio of said coccidiostat to said zeolite being from about 0.2 weight percent to about 15 weight percent, such that said coccidiostat and said zeolite coexist in said poultry.

11. The method of claim 10 wherein said coccidiostat and said zeolite are admixed in an ingestable media prior to administering.

12. The method of claim 10 wherein said ingestable media is feed.

13. The method of claim 10 wherein said zeolite is the carrier of said coccidiostat during administering.

14. The method of claim 10 wherein said coccidiostat and said zeolite are sequentially administered.

15. The method of claim 10 wherein the ionophoric coccidiostat is a polyether antibiotic.

16. The method of claim 10 wherein said coccidiostat is selected from a group consisting of lasalocid, monesin, salinomycin and halofuginone.

17. A composition comprising a zeolite and a coccidiostat wherein the ratio of said zeolite to said coccidiostat is in a weight ratio of said coccidiostat to said zeolite being from about 0.2 weight percent to about 15 weight percent and is effective to enhance the effectiveness of the coccidiostat in reducing coccidial-induced intestinal lesions in poultry.

18. A composition in accordance with claim 17 manufactured in situ within the gut of said poultry.

19. A composition in accordance with claim 17 wherein said coccidiostat is absorbed onto said zeolite.

20. A composition in accordance with claim 17 wherein said coccidiostat is selected from a group consisting of lasalocid, monesin and salinomycin.

21. A composition in accordance with claim 20 wherein the zeolite is zeolite A.

22. A composition comprising a zeolite and a coccidiostat wherein the weight ratio of said coccidiostat to said zeolite is from about 0.2 weight percent to about 15 weight percent and is effective to enhance the reduction of coccidial-induced pigmentation loss in the shank of poultry.

23. A composition in accordance with claim 22 manufactured in situ within the gut of said poultry.

24. A composition in accordance with claim 22 wherein said coccidiostat is absorbed onto said zeolite.

25. A composition in accordance with claim 22 wherein said coccidiostat is selected from a group consisting of lasalocid, monesin, salinomycin and halofuginone.

* * * * *